April 9, 1968  R. G. KAMPS ET AL  3,376,955
MOUNTING MEANS FOR BRAKE BLOCK AND ACTUATING PISTON
Filed Dec. 29, 1965
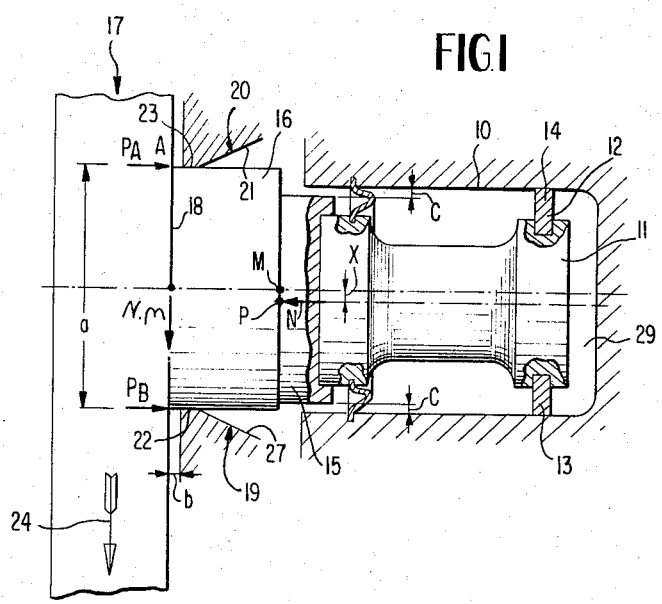
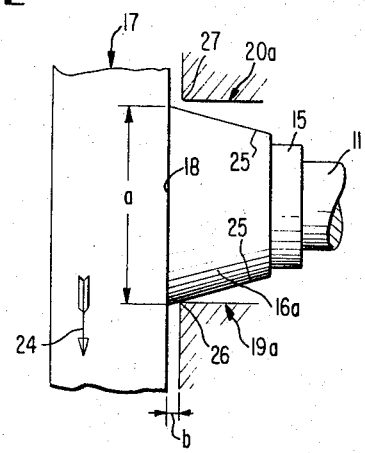
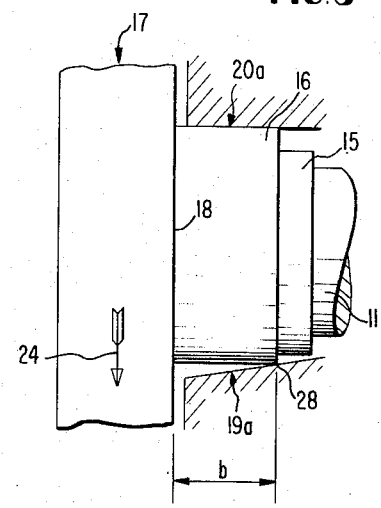
INVENTORS
REINHOLD G. KAMPS
MANFRED H. BURCKHARDT
GÜNTER FUNKE
BY *Dicke & Craig*
ATTORNEYS United States Patent Office 3,376,955
Patented Apr. 9, 1968

3,376,955
MOUNTING MEANS FOR BRAKE BLOCK
AND ACTUATING PISTON
Reinhold G. Kamps, Vaihingen, Manfred H. Burckhardt, Waiblingen, and Günter Funke, Schmiden, Germany, assignors to Daimler-Benz Aktiengesellschaft, Stuttgart-Unterturkheim, Germany
Filed Dec. 29, 1965, Ser. No. 517,284
Claims priority, application Germany, Dec. 31, 1964,
D 46,168
6 Claims. (Cl. 188—73)

ABSTRACT OF THE DISCLOSURE

The present disclosure relates to a spot type disk brake for vehicles, especially for motor vehicles, whereby the brake lining is guided in lateral slideways and is pressed into abutment—possibly by way of a pressure plate—by means of a piston that can pivot about an imaginery point spaced from the disk plane as far as possible. The brake lining block is supported in a substantially moment-free manner by having its lateral abutment places being arranged exclusively substantially directly adjacent to the plane of the brake disk and having a lost motion connection with the piston in the forward rotation direction to shift the piston pressure center point from the center of the brake block by predetermined amount substantially equal to the product of the distance of the abutment point from the disk plane and the average friction coefficient between the brake disk and the brake block.

---

With such types of disk brakes, a disturbing squeak occurs frequently, principally at low driving velocities, for example, at 5 to 40 kilometers per hour and at low brake pressures of about 10 to 40 atmospheres absolute excess pressure. The sound frequencies vary thereby between 2,000 to 10,000 Hz with large amplitudes; that is, with high sound intensity.

As cause of this brake squeaking have been recognized the oscillations of the block-shaped brake lining, normally consisting of a mixture of asbestos and synthetic plastic gums, of steel shavings and of brass shavings, on the one hand, and of the brake disk, on the other. The generation of these oscillations takes place by a continuous rhythmic fluctuation or oscillating motion of the brake force, the so-called stick-slip-effect whereby additionally a mutual feedback takes place which occurs to a particularly large extent with double brakes arranged symmetrically to the brake disk in a clamp-like manner.

A fluctuation of the brake force, the stick-slip effect, however, is the consequence of a non-uniform abutment of the brake blocks against the brake disk, of a line contact between the brake disk and the brake block which is effected by a canting or tilting of the latter by reason of a brake-force torque about the lateral point of abutment or support of the brake block.

The present invention has as its aim to keep this brake-force torque as small as possible, and more particularly, on the one hand, by a reduction of the lever arm, and on the other, by compensation. Accordingly, the present invention proposes that the system consisting of piston and brake lining is supported essentially torque-free only at two places in the brake support and the lateral abutment place of the brake lining is arranged exclusively directly adjacent to the plane of the brake disk.

It has already been attempted to locate the abutment place in direct proximity of the brake disk plane in that the lateral parallel slideways were extended as near as possible to the brake disk. The slightest inaccuracies as regards machining of the brake block and/or of the slideways, however, may cause in an undesired manner a displacement of the abutment place away from the brake disk and therewith a larger lever arm for a large brake-force moment. Since additionally the brake block wears unilaterally and tilts in due course of time owing to the frequent use of the brake during forward driving and by reason of the unavoidable residual lever arm through the abutment place, the abutment place recedes from the brake disk during braking while driving backward by an amount corresponding to the brake block thickness whereby again a larger brake-force moment results. In order to limit the distance of the abutment or support places from the brake disk both during braking when driving in the forward as well as in the backward direction with certainty to a minimum, one embodiment according to the present invention provides that the lateral abutment surfaces for the brake lining arranged at the brake bracket are relieved in a cone-like manner whereby the smaller cone diameter faces the brake disk. With brake blocks that deviate from the cylindrical shape, of course, the relieving operation has to deviate also correspondingly from the cone shape.

However, since a purely conically shaped construction of the abutment surfaces does not enable a good brake-block guidance, another embodiment in accordance with the present invention provides that the abutment surfaces arranged at the brake bracket are composed of surfaces which are inclined to the lateral surfaces of the block and of surfaces which extend parallel to each other—for purposes of guidance of the brake block—whereby the parallel surfaces are disposed adjacent the brake disk. Again, a cone shape may be used in this case in the same sense and in an analogous manner as before.

With such a construction of the abutment surfaces, the surfaces of the brake block in contact with the abutment surfaces are constructed parallel to its center axis. However, it is also possible, as proposed by a still further modified embodiment of the present invention, that the brake lining itself has a cone-like shape, whereby the larger cone diameter is coordinated to the brake disk and whereby the abutment surfaces in the brake bracket are constructed parallel to the block axis. Again, what has been stated above applies in an analogous manner to such an arrangement.

Since the piston is arranged in a pivotal manner in the disk brake underlying the present invention in order to be able to participate in the tilting of the brake block resulting from the one-sided brake block wear, it would also be feasible within the scope of the present invention that with such a tilting, the piston at the end thereof facing the brake disk or the pressure plate arranged between the piston and the brake block might come into contact with the cylinder wall, whereby on the one hand, the ability to tilt or pivot on the part of the piston would be lost, and on the other, this contact place might simultaneously represent the abutment or support place of the brake block which would lead to an undesirable large brake-force torque. As a further measure, in order to approach the abutment or support place of the brake block with certainty as close as possible to the disk plane, and in order to avoid a redundancy in determination by more than two support points, it is proposed in accordance with the present invention that the play between the piston rim facing the brake disk or a pressure plate arranged between the piston and brake lining, on the one hand, and the cylinder, on the other, is larger than the largest permissive tilting of the piston or piston system. However, in addition to keeping low the brake-force torque by reducing the lever arm, it is also possible to completely compensate the brake-force torque, and more particularly, in that during loading of the brake block by the piston, the pressure center point deviates by a certain amount from the center of the brake block whereby this deviation occurs during the direction of rotation of the brake disk while driving forward and whereby the amount of deviation is equal to the product of the distance of the abutment or support point from the disk plane and the friction coefficient between the brake disk and the brake block. In order to take into consideration variations or fluctuations of the frictional coefficient, it is of advantage to use an average value.

It is furthermore of importance, in order to achieve a uniform abutment of the brake block, that in case of an eventual tilting thereof by reason of non-uniform wear, a relative movement can take place between the brake block and the piston or the brake block and a pressure plate arranged between the brake block and the piston. In order to permit this relative movement, the present invention provides a lubricant, for example, a layer of "Teflon" or kinematically guiding material between brake block and piston or brake block and pressure plate.

Accordingly, it is an object of the present invention to provide a spot-type disk brake for vehicles, especially motor vehicles, which avoids by simple means the aforementioned shortcomings and drawbacks encountered with the prior art constructions.

It is another object of the present invention to provide a disk brake for motor vehicles which eliminates the squeaking noises normally occurring in the prior art systems, especially at low speeds and low brake pressures.

A further object of the present invention resides in a disk brake for motor vehicles in which the stick-slip effect is eliminated together with fluctuations of the brake force.

Still another object of the present invention resides in a disk brake for motor vehicles in which the brake-force torque is kept as small as possible.

A still further object of the present invention resides in a disk brake for motor vehicles which not only achieves all of the aforementioned aims and objects in an extremely effective and simple manner but which also eliminates the need for extraordinarily small tolerances in the manufacture of the parts thereof.

These and further objects, features, and advantages of the present invention will become more obvious from the following description when taken in connection with the accompanying drawing which shows, for purposes of illustration only, several embodiments in accordance with the present invention, and wherein:

FIGURE 1 is a partial schematic longitudinal cross-sectional view through one embodiment of a disk brake in accordance with the present invention;

FIGURE 2 is a partial schematic longitudinal cross-sectional view, similar to FIGURE 1, of a modified embodiment of a disk brake in accordance with the present invention; and FIGURE 3 is a partial schematic longitudinal cross-sectional view, through a prior art disk brake construction, explaining the disadvantages thereof.

Referring now to the drawing wherein like reference numerals are used throughout the various views to designate like parts, and more particularly to FIGURE 1, reference numeral 10 designates therein the cylinder of the brake system. The piston 11 is arranged in the cylinder 10 to be pivotal at places 13 and 14 by means of the liquid seal 12. The piston 11 carries in front a pressure plate 15 which is in contact with the brake block 16. A play $c$ is provided between the pressure plate 15 and the cylinder 10. This play $c$ has to be so large that even with largest permissive tilting of the brake block 16 (FIG. 1) or 16a (FIG. 2) by reason of wear thereof, no more than one abutment or support point of the system "piston-pressure-plate-brake block" occurs within the cylinder 10. This disk brake is illustrated in its engaged position in FIGURE 1, i.e., the brake block 16 abuts against the brake disk 17 and contacts the latter within the disk plane 18. The brake block 16 (FIG. 1) or 16a (FIG. 2) is laterally guided by means of support or abutment surfaces 19 and 20 or 19a and 20a, respectively.

In the embodiment according to FIGURE 1, the abutment or support surfaces 19 and 20 are provided with conically shaped relieved portions 21—shown in the drawing in an exaggerated manner—and the brake block 16 is supported at the support or leading abutment place 22 during forward driving and at support or leading abutment place 23 during backward driving. The direction of rotation of the brake disk 17 during the forward driving is indicated by the arrow 24.

In the embodiment according to FIGURE 2, the brake block 16a is constructed in a cone-like manner by means of inclined surfaces 25 and is supported in the abutment surfaces 19a and 20a at the abutment places 26 and 27, respectively.

FIGURE 3 illustrates a disadvantageous prior art construction of a partial-lining disk brake whereby both the lateral surfaces of the brake block 16 as well as the abutment surfaces are constructed parallel to the axis as shown in the upper half of the figure. By reason of inaccurate machining of the abutment surfaces 19a, the distance $b$ of the abutment place 28 from the disk plane 18 may become very large as indicated in the lower half of the drawing.

The braking operation is initiated by means of the brake fluid which enters into the space 29 of the cylinder 10 and presses the piston 11 in the direction toward the brake disk 17. The brake pressure is transmitted by means of the pressure plate 15 from the piston 11 to the brake block 16 or 16a.

If one designates the abutment pressure by N, then by reason of the friction between the brake disk 17 and the brake block 16 or 16a there results the brake force $N \cdot \mu$. This force produces a brake-force torque M about the abutment places, for example, about abutment place 22 in FIGURE 1 which has the following value:

$$M = N \cdot \mu \cdot b$$

The brake-force torque M effectuates a one-sided abutment of the brake block. If one imagines, for example, the entire abutment pressure or force to be concentrated at the outermost point of the brake block then one obtains:

$$P_A = \frac{N}{2} + \frac{M}{a}$$

$$P_B = \frac{N}{2} - \frac{M}{a}$$

With uniform abutment, one would obtain $$P_A = P_B = N/2$$

In order to achieve as uniform an abutment as possible, M has to be kept as small as possible. Since $M = N \cdot \mu \cdot B$, this means that $b$ has to be small.

The amount of deviation $x$ for compensating the brake-force torque M can be derived with the aid of FIGURE 1. Since the sum of the moments about the point A has to be equal to zero, it follows:

$$P_B = \frac{N}{a}(a/2 + x - \mu \cdot b)$$

Since the sum of the forces has to be equal to zero, it follows:

$$P_A = \frac{N}{a}(a/2 - x + \mu \cdot b)$$

From the condition $P_A = P_B$, it follows for $x$:

$$a/2 + x - \mu \cdot b = a/2 - x + \mu \cdot b$$
$$2x = 2 \cdot \mu \cdot b$$
$$x = \mu \cdot b$$

While we have shown and described several embodiments in accordance with the present invention, it is understood that the same is not limited thereto but is susceptible of numerous changes and modifications as known to a person skilled in the art and we therefore do not wish to be limited to the details shown and described herein but intend to cover all such changes and modifications as are encompassed by the scope of the appended claims.

We claim:

1. A disk brake for vehicles, especially motor vehicles in which the brake lining is guided in lateral slide ways and is pressed against a brake disk by means of a piston, comprising: a rotatable disk to be braked; a cylinder having an axis generally perpendicular to said disk; a brake block provided with a brake lining engaging said disk; piston means within said cylinder for forcing said brake block against said disk; relatively fixed brake support means for supporting the brake system consisting of said piston means and brake block against rotation with said disk during the braking operation only at two axially spaced support places in a substantially moment-free manner; said support means including a lateral abutment surface engaging the leading outer side of said brake lining; one of said support places being the lateral abutment surface of said brake lining and being exclusively substantially directly adjacent to said disk only at the axial end of said brake lining engaging said disk; means connecting said brake block and said piston means for free lost sliding motion in the rotational direction of said disk; said support means other support place being at the axial end of said piston opposite from said disk to at least partially constitute means supporting said piston for pivotal motion within said cylinder to pivot with said brake block during uneven wear and maintain a firm surface engagement between said piston means and said brake block.

2. The disk brake of claim 1, wherein at least one of the adjacent surfaces of said fixed support means and said brake block is relieved in a tapered manner to increase relative spacing therebetween in the direction away from said disk.

3. The disk brake according to claim 2, wherein said at least one adjacent surface consists of a conical portion adjacent said piston and a cylindrical portion adjacent said disk, and the other of said adjacent surfaces is cylindrical.

4. The combination according to claim 3, further comprising means for producing a displacement of the effective loading of the brake block means by said piston means by shifting the pressure center point from the center of the brake block means by a predetermined amount, said shifting taking place in the direction of rotation of the brake disk while driving in the forward direction, and the amount of shifting beng approximately equal to the product of the distance of the abutment pont from the disk plane and the friction coefficient between brake disk and brake block means.

5. The combination according to claim 1, further comprising means for producing a displacement of the effective loading of the brake block means by said piston means by shifting the pressure center point from the center of the brake block means by a predetermined amount, said shifting taking place in the direction of rotation of the brake disk while driving in the forward direction, and the amount of shifting being approximately equal to the product of the distance of the abutment point from the disk plane and the friction coefficient between brake disk and brake block means.

6. The combination according to claim 5, further comprising lubricant means between said brake block and said piston means.

References Cited

UNITED STATES PATENTS

| Re. 24,870 | 9/1960 | Butler | 188—73 |
| 2,657,772 | 11/1953 | Chamberlain | 188—73 X |
| 2,942,695 | 6/1960 | Butler | 188—73 |
| 3,119,468 | 1/1964 | Mossey | 188—152 X |
| 3,185,258 | 5/1965 | Douglas | 188—73 |
| 3,236,335 | 2/1966 | Dowell | 188—73 |

FOREIGN PATENTS 730,053  5/1965  Great Britain.

MILTON BUCHLER, *Primary Examiner.*

G. E. A. HALVOSA, *Assistant Examiner.*